United States Patent [19]

Reidinger, Jr.

[11] Patent Number: 4,541,199

[45] Date of Patent: Sep. 17, 1985

[54] METHOD AND AUTOMATED DEVICE FOR APPLYING MEASURED AMOUNTS OF CONTROL LIQUIDS TO THE DORSAL FUR OF RODENT PESTS

[75] Inventor: Russell F. Reidinger, Jr., Exton, Pa.

[73] Assignee: Monell Chemical Senses Center, Philadelphia, Pa.

[21] Appl. No.: 434,168

[22] Filed: Oct. 13, 1982

[51] Int. Cl.$^4$ ............................................. A01M 25/00
[52] U.S. Cl. ........................................ 43/131; 43/900; 222/58
[58] Field of Search .................... 43/131, 124, 132.1, 43/900; 222/58; 118/506, 676

[56] References Cited

U.S. PATENT DOCUMENTS

| 3,214,857 | 11/1965 | Tyrone et al. | 42/69 R |
| 3,217,445 | 11/1965 | Wade | 43/131 |
| 3,225,485 | 12/1965 | Powell | 43/67 |
| 3,327,901 | 6/1963 | Yerkovich | 222/52 |
| 3,370,571 | 2/1968 | Knapp | 43/132.1 |
| 3,517,454 | 6/1979 | Query | 43/131 |
| 3,566,837 | 3/1971 | Denham | 119/1 |
| 3,949,709 | 4/1976 | Myers | 119/159 |
| 4,126,104 | 11/1978 | Overby | 119/159 |
| 4,132,026 | 1/1979 | Dodds | 43/131 |
| 4,349,981 | 9/1982 | Sherman | 43/131 |
| 4,421,800 | 12/1983 | Schoenberg et al. | 118/314 |

OTHER PUBLICATIONS

Davis, R. A. "Proposed Laboratory Methods for Evaluation of Rodenticidal Dusts", *Int. Biodeterior. Bull.* 12:106–111, (1976).
Mason et al., "Exploitable Characteristics of Neophobia and Food Aversions for Improvements in Rodents and Bird Control", *Vertebrate Pest Control and Management Materials: Fourth Symposium* ASTM STP 817, (1983).
Marsh, R. E., "Tracking Powders, Providing Effective Rodent Control", *Pest Control,* 50:42, pp. 44–48, (Apr. 1983).
Mason et al., "Flavor Aversions in Grooming Depend on Context and Hormonal Factors. Draft Manuscript Submitted for Publication.
Geyer et al., "Effects of Tastants on Caching, Gnawing, Grooming and Taste Aversions in Pine Velos (*microtus pinetorum*) and Meadow Voles (*M. pennsylvanicus*), *Proc. Fifth Eastern Pine Vole Symp.,* pp. 95–109.
Mason et al., "Social Context Affects Expression of Conditioned Taste Aversions during Grooming by Pine Voles: Implications for Animal Damage Control", *Proc. Fifth Eastern Pine Vole Symp.,* pp. 110–119.
Marsh, Dept. of Animal Physiology, Univ. of California, Davis, CA "Recent Developments in Tracking Dusts", p. 129, Blean Fall, 1972.
Davis, "Methods for Laboratory Testing of Rodenticidal Dusts", EPPO Bull. 7, (2): 479–483, (1977).
Williams, "Field Testing Zinc Phosphide Tracking Powder", Pest Control, Nov. 1977.
Meehan, "The Evaluation of Contact Rodenticides for Mouse Control, Int. Biodetn. Bull., (ISSN 0020–6164)12(2) 1976, 59–63.
Drummond, "Partial Avoidance of a Rodenticidal Dust by *Rattus rattus L.*"Parasitica, 1960, vol. XVI, No. 1.
Pratt et al., "Control of Domestic Rats & Mice", CDC, Reprint Jul. 1977, HEW Publ. No. (CDC) 77–8141.

(List continued on next page.)

Primary Examiner—Nicholas P. Godici
Assistant Examiner—C. McKee
Attorney, Agent, or Firm—Woodcock Washburn Kurtz Mackiewicz & Norris

[57] ABSTRACT

A novel method and apparatus for applying materials, such as poisons or other rodent control liquids, to the dorsal fur of rodents is disclosed. The apparatus is suspended over a suspected rodent scent trail, senses the presence of a rodent in a target region located along that trail, and responsive to such sensing dispenses material from a reservoir contained in the apparatus onto a dorsal fur region of the rodent. The control materials are subsequently ingested during habitual grooming behavior. The method and apparatus of the present invention is intended to overcome bait shyness, neophobia, and primary and conditioned taste aversions.

40 Claims, 4 Drawing Figures

OTHER PUBLICATIONS

"ICI Americans Opens 'State of the Art' Rodent Research Facility", Pest Control Technology, Sep. 1982, vol. 10, No. 9, pp. 45–48.

Larry Pank, U.S. Fish & Wildlife Service, Wildlife Damage Research Stn., Hilo, Hawaii, Monthly Narrative for Feb. 1977.

Vertebrate Damage Control Research in Agriculture, Annual Report 1977, Denver Wildlife Research Center, U.S. Fish and Wildlife Service.

"Vertebrate Damage Control Research in Agriculture", Annual Report 1979, Denver Wildlife Research Center, U.S. Fish and Wildlife Service.

Denver Wildlife Research Center Section of Supporting Sciences "1979 Annual Progress Report".

Denver Wildlife Research Center Section of Supporting Sciences "1980 Annual Progress Report".

Denver Wildlife Research Center Section of Supporting Sciences "1981 Annual Progress Report".

Proceedings of the Fifth Eastern Pine and Meadow Vole Symposium, Gettysburg, PA, Mar. 4–5, 1981.

Reindinger et al., "Conditioned Aversion to a Taste Perceived While Grooming", Physiology & Behavior, vol. 28, pp. 715–723, 1982.

R. Reidinger Notes: Re: Monell Sponsor's Meeting Oct. 11–12, 1979.

R & D Technical Seminar, Monell Chemical Senses Center, Rondelle, Feb. 25, 1980, with R. Reidinger Notes on Test of Presentation.

R. Reidinger Notes: Re: Test of Presentation at Monell Executive Meeting Held on May 1, 1980.

R. Reidinger Notes Entitled "Research Discussions: International Programs/Supporting Sciences".

Third Annual Meeting, Sarasota, Florida Apr. 22–26, 1981, Association for Chemoreception Sciences, with Reidinger Text Notes of the Presentation.

Program for the Psychonomic Society Twenty-Second Annual Meeting, Nov. 12, 13, 14, 1981, with Reidinger Text Notes Prepared for the Meeting.

Monell Project Presentation to the Program Review Team at the Denver Wildlife Research Center on Nov. 19, 1981.

Reidinger Presentation Text Entitled "The Current Status of Rodent Control and Research on Rodent Control", Presented Dec. 17, 1981.

METHOD AND AUTOMATED DEVICE FOR APPLYING MEASURED AMOUNTS OF CONTROL LIQUIDS TO THE DORSAL FUR OF RODENT PESTS

This invention was made with Government support under a Cooperative Agreement awarded by the U.S. Department of the Interior, U.S. Fish and Wildlife Service. The Government has certain rights in this invention.

BACKGROUND OF THE INVENTION

A. Field of the Invention

The present invention relates to the field of devices for delivering bait, poisons or other control substances for voluntary consumption by rodent pests.

More particularly, this invention relates to devices wherein the time of consumption of a bait, poison or other control substance is subsequent to the time of exposure of the pest to the delivery device.

B. Description of the Prior Art

Many mechanical and chemical techniques have been employed to control rodent pests. Most voluntary-ingestion bait delivery systems require the rodent to consume a control substance while in or around the bait delivery apparatus. Those rodents which are not killed as a result of their first exposure to an apparatus thus develop a conditioned taste aversion to the bait, and may develop as well an aversion to the apparatus which has delivered that bait, or to the location of that apparatus. Since most voluntary-ingestion bait delivery systems can not ensure that a lethal amount of the bait will be consumed by each exposed rodent, most such systems fail to control a proportion of the exposed rodent population.

Many rodents exhibit primary taste aversions for conventional baits. One otherwise suitable poison, Norbormide, is highly selective to rodents, yet has an unusually bitter taste which causes rodents to avoid its consumption in lethal quantities. Accordingly, many baits cannot be used in voluntary-ingestion bait delivery systems.

Most rodents are quite neophobic. They shy away from new objects placed in their environment, and will avoid ingestion of new tastes. In order to overcome such neophobia it has been suggested that rodents first be fed a bait carrier which does not contain any poison or control agent. Once the quantity of the bait carrier consumed has reached an amount which would be sufficient to accomplish the control objective, the poison or control agent is added to the carrier to achieve that objective. Unfortunately, this method has achieved only limited success in the field.

In order to overcome bait shyness, tracking dusts and powders are often used. These dusts and powders are dry agents which cling to the feet and underbelly of a target animal as it walks through those agents. The agents are subsequently ingested by the rodent during its habitual grooming behavior. It has been found, however, that rodents sometimes prefer not to walk on dusts or powders and/or may not pick up a sufficient amount of such agents to ensure that a proper control dose will be consumed. A major criticism of tracking powders and dusts is that these materials are also "tracked" by the pest, causing unnecessary environmental contamination. Accordingly, tracking dusts and powders are most often applied in restricted areas (such as sealed walls) so that the possibility of environmental contamination is minimized.

The patent literature also contains disclosures relating to various poison delivery devices. See for example, U.S. Pat. No. 3,217,445 (Wade), which discloses a rodent exterminator including a rodent actuated trip 32 for actuating an injection mechanism. Once tripped, the rodent is injected through the skin with a delayed action poison which kills the rodent after it leaves the exterminator. U.S. Pat. No. 3,225,485 (Powell) discloses an animal trap for poisoning rodents while preventing other animals from being exposed to the poison. In Powell's device, the presence of a rodent is sensed in the trap and exterior doors are closed before exposing the rodent to the poison. See also U.S. Pat. Nos. 3,517,454 (Query) and 3,566,837 (Denham).

The patent literature also discloses other apparatus which is useful for applying materials, such as insecticides, to the dorsal regions of animals, such as cows, for the purpose of improving the health and well being of the target animal. See for example, U.S. Pat. No. 3,949,709 (Myers) and U.S. Pat. No. 4,126,104(Overby).

As seen from the above, a need still exists for simple effective methods and apparatus for controlling rodent pests.

SUMMARY OF THE INVENTION

The present invention provides a novel apparatus for automatically dispensing a measured amount of a liquid control material onto the dorsal fur portion of a rodent pest. This material is subsequently ingested during the rodent's habitual grooming behavior.

Applicant has recognized that most rodent pests have highly developed senses of smell. The nocturnal habits of such pests cause them to navigate as much by their sense of smell as through the use of eyesight. Most rodent pests establish routine scent trails which are conveniently located along a wall-floor interface, along laboratory or factory gantries, or in other readily identifiable locations. Accordingly, the device of the present invention does not substantially interfere, either in a visual or olfactory sense, with established scent trails.

Applicant has also recognized that if a measured amount of a control substance is applied to the dorsal fur area of a rodent, there is a high probability that an effective dose of that control substance will be subsequently ingested during that rodent's habitual grooming behavior. However, even if an insufficient amount of control substance is ingested after a first exposure, any subsequent non-lethal illness is unlikely to be associated with the dispensing device. Accordingly, the present invention provides a rodent control method which maximizes the likelihood of achieving effective rodent control, while reducing the probability that substantial aversions to the device or control substances will develop in the rodent population.

The preferred embodiment of the present invention accordingly comprises a housing suspended over a suspected rodent trail, a reservoir mounted in said housing containing liquid rodent control materials, rodent sensing means disposed generally above said trail for detecting the presence of a rodent in a target region along said trail, and material dispensing means responsive to said rodent sensing means for dispensing a predetermined amount of said material from said reservoir onto the dorsal region of said rodent. In an alternate embodiment, the rodent sensing means also ascertains the relative size of the rodent and causes a proportional dose of control material to be applied by the dispensing means.

As seen from the above, a primary object of the present invention is the provision of a dispensing device which applies measured amounts of a rodent control material to the dorsal fur of rodent pests.

A further aim of the present invention is the provision of a rodent control device which minimizes the neophobia exhibited by the target species.

A further object of the present invention is the provision of a rodent control device which minimizes the effects of primary and conditioned taste aversions.

These and other objects of the present invention will become apparent from the following more detailed description.

DESCRIPTION OF THE PREFERRED EMBODIMENTS

While specific examples have been selected for reference in connection with the following description, those of ordinary skill in the art will recognize that departures may be made from the materials and methods described hereinafter without departing from the scope of the present invention, which is defined more particularly in the appended claims.

The preferred embodiment apparatus of the present invention is designed to apply rodent control materials, such as poisons, to the dorsal fur region of rodents.

Figure 1:
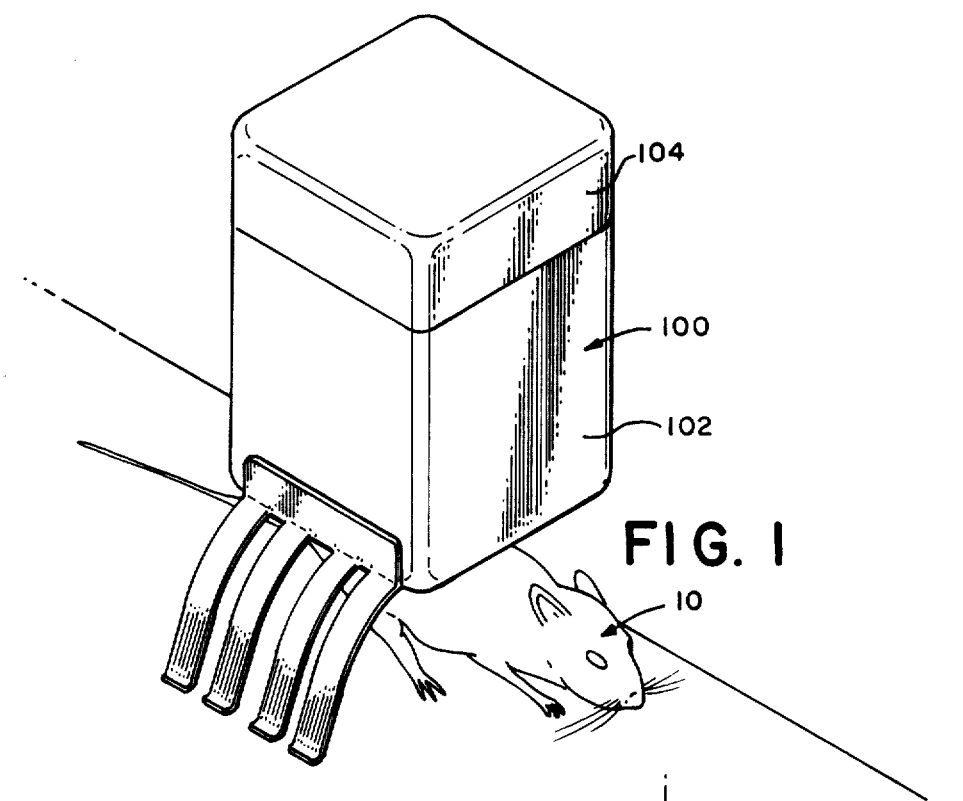
FIG. 1 is an isometric view of the preferred embodiment device of the present invention shown mounted over a rodent trail at a wall-floor interface.
Figure 2:
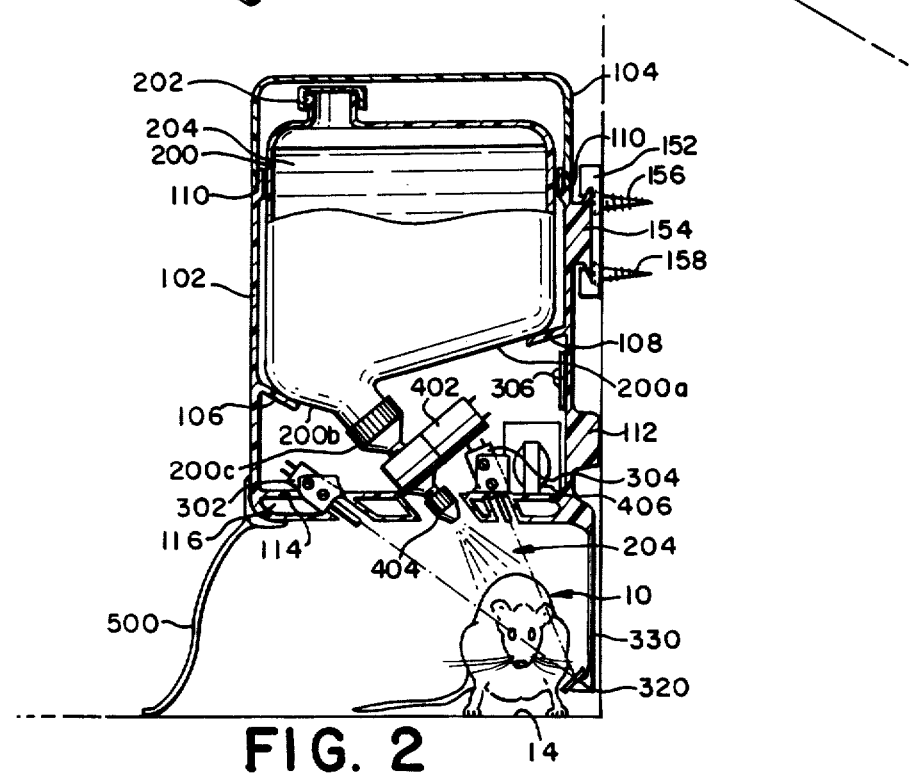
FIG. 2 is a cross-section of the preferred embodiment device of FIG. 1, taken along a plane which is perpendicular to the wall illustrated in FIG. 1.
Figure 3:
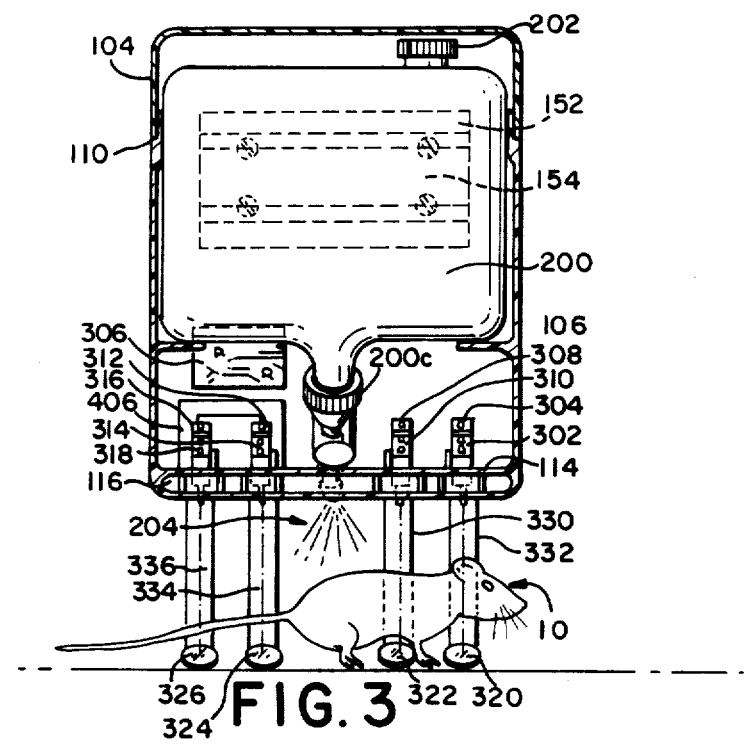
FIG. 3 is a cross-section of the preferred embodiment device of FIG. 1, taken along a plane which is perpendicular to the plane of FIG. 2.

With reference to FIGS. 1-3, this preferred embodiment comprises a housing which is suspended over a suspected rodent trail. As illustrated in FIGS. 1-3, one common location for such a trail is at a wall-floor interface. Accordingly, the embodiment of FIGS. 1-3 is particularly adapted for installation over a trail located at that interface. The preferred housing designated generally 100 comprises a box 102 onto which a top 104 is fitted using flange 110. The housing is suspended over a suspected rodent trail 14 using a suspension means which comprises a bracket 152 which is attached to the wall using screws 156 and 158. The bracket 152 defines a track which is interlockingly engaged by track 154 which projects from a back surface of the box. Accordingly, the entire device may be installed simply by mounting bracket 152 at the appropriate height and laterally sliding track 154 into its installed position.

The preferred apparatus of the present invention further comprises a reservoir 200 for containing liquid rodent control materials, rodent sensing means disposed generally above trail 14 for detecting the presence of a rodent in a target region located along said trail; and material dispensing means responsive to said rodent sensing means for dispensing a predetermined amount of a said material from said reservoir onto a dorsal fur region of said rodent while said rodent is within said target area.

Reservoir 200 is also generally box shaped, and designed to slidingly engage interior surfaces of the housing, 100 so that it may be easily removed therefrom when the top 104 of the housing is not in place. The lower surfaces of the reservoir 200 define a first lower inclined surface 200a and a second lower inclined surface 200b which converge towards a spout which is fitted with a spout cap 200c. The inclined surfaces of the reservoir cooperate with an upper inclined boss 108 and lower inclined boss 106 which project inwardly from the housing to cooperate with the reservoir to align the spout and associated dispensing equipment so that they are properly aimed at a target region disposed along trail 14.

The rodent sensing means is disposed generally above the trail in a manner which causes minimal visual or olfactory interference with the scent trail. The preferred rodent sensing means comprises a plurality of sensors located along the trail for detecting the rodent position with respect to the target area. In the preferred embodiment, each of these sensors comprises an infrared light source, such as light sources 302, 310, 314 and 318, and infrared detector, such as detectors 304, 308 and 312 and 316. Each of the infrared light sources is aimed to bounce off a reflective surface such as mirrors 320, 322, 324 and 326 which cause the infrared light to bounce back to its respective detector unless interrupted by a rodent on the rodent trail. Although in alternate embodiment it may be permissible to locate the reflective surface directly on the suspected rodent trail, it is presently preferred to dispose the reflective surfaces generally adjacent to and above the trail, as for example on mirror standards 330, 332, 334 and 336. The use of such standards to locate reflective surfaces above but adjacent to trail 14 prevents the preferred device from substantially interfering with the scent trail on the floor, while at the same time facilitating prealignment of the sensing means prior to installation.

Although the above described sensors are presently preferred it is understood that suitable sensors also comprise heat sensors, ultrasonic motions sensors, vibrations sensors, or a combination of the above. Vibration sensors are believed particularly suitable when the apparatus is applied on a vibration sensitive surface such the tree limb illustrated in FIG. 4.

The rodent sensing means of the preferred embodiment device is designed to sense not only the presence of a rodent on the portion of the rodent trail located generally under the housing, but also to ascertain whether the rodent is located within a target region disposed under the rodent control material dispensing means. Accordingly, a conventional logic chip is provided for determining whether at least two of the sensors located on opposite sides of the target region are simultaneously interrupted, whereupon a timed release of the control substance by the dispensing mechanism will be effected for a predetermined length of time. In accordance with the preferred embodiment, the sensors may also detect the relative size of the animal located in the target region as measured by the number of sensors and/or the interruption which the animal causes for each of the sensors. For example, an animal which simultaneously interrupts all four of the sensors may be determined to be a larger animal, and therefore be subject to a larger dose of control material.

The material dispensing means of the present invention comprises an electrically actuated valve and a nozzle means for directed liquid control material towards the target region when the valve is in its open position. As shown in FIGS. 1-3, the electrically controlled valve 402 is preferably a valve which is in communication with the spout cap 200c of the reservoir which in turn communicates to a nozzle 404 which is aimed towards the target region. Since the reservoir 200 is vented to the atmosphere by vented cap 202, when valve 402, which may be a solenoid valve, is opened, a gravity spray of liquid control material 204 will be dispensed into the target region. The actual amount of material dispensed into the control region may be varied either by the amount of time the valve is left in its open position and/or the degree to which the valve is opened. In the preferred embodiment an internal power source (battery and/or transformer) 406 is provided for powering chip 306, sources 302, 310, 314 and 318, sensors 304, 308, 312 and 316 and solenoid valve 402. External power may also be employed. Although not shown in the drawings, one of ordinary skill in the art will recognize that the infrared light sources, detectors, chip, power source and solenoid valve should be appropriately connected by leads. In particular, the solenoid valve 402 should be connected to the remainder of the wiring with leads of sufficient length to allow the entire dispensing mechanism to be removed with the reservoir without disconnecting the electrical leads attached thereto. By mounting the entire dispensing means on the reservoir, as shown in FIG. 2, its easy removal for servicing and adjustment may be effected simply by removing top 104 and withdrawing the entire reservoir from the housing.

The present invention also comprises sound deadening means for the purpose of minimizing auditory conditioning of target animals exposed to the device. Accordingly, a baffle 114 defining a sound deadening chamber 116 is disposed above the floor of the box. Sound deadening materials such as insulation, may also be packed into the lower region of the box to further reduce the noise created during the operation of the device. Accordingly, it is anticipated that the noise level emitted by the device toward the rodent trail will not be sufficient to create a conditioned avoidance of the trail by the target rodent pests.

As seen in FIGS. 1-3 the height of box 102 is designed to permit target rodents to pass thereunder nearly free of obstruction. Since it is desired, however, to further exclude non-target species from the device, a fingered guard designated generally 500 is provided which further restricts access of nontarget species to the target region of the device. In combination with the above described sensing means of the present invention, this guard minimizes the likelihood that a nontarget species, such as a cat, might be unnecessarily exposed to control liquid 204.

Figure 4:
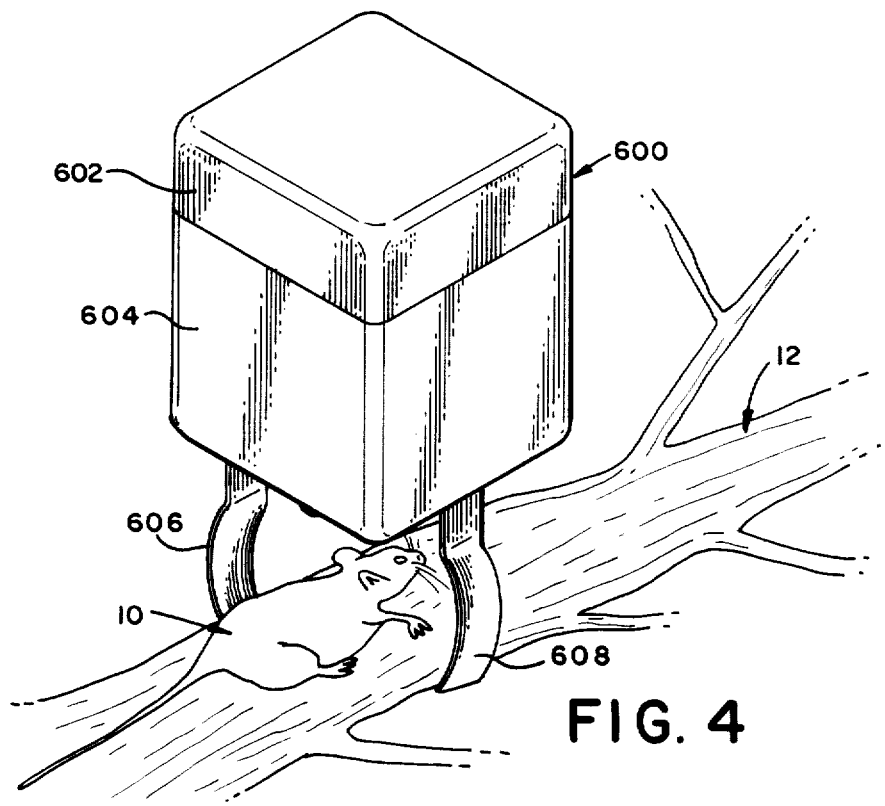
FIG. 4 is an alternate embodiment of the present invention, which is shown mounted on a tree limb.

It is also anticipated that the apparatus of the present invention may be installed over trails located in other positions. In FIG. 4, an alternate embodiment device designed for installation over a tree is illustrated. This device, designated generally 600, operates in the same manner as described for the embodiment of FIGS. 1-3. In this embodiment, however, elongated support members 606 and 608, which are attached to a lower surface of the tree limb, position the remainder of the apparatus at a predetermined distance above the tree limb surface. For the particular embodiment shown, the sensing means is a heat sensor or ultrasonic sensor which does not require the reflective surfaces shown in the embodiments of FIGS. 1-3. As before, the box shaped housing 604 is fitted with an easily removable top 602 which facilitates easy refill of the reservoir contained therein. Target animals, such as rodent 10 which travel along tree limbs, such as tree limb 12, will therefore receive the desired dosage of control material, whereas the orientation of member 606 and 608 help to exclude non-target species from the target region located under the remainder of the device.

As seen from the above, a simple inexpensive apparatus is provided which should be effective in controlling target rodent pests.

What is claimed:

1. A system for applying liquidous rodent population control materials such as poisons, to the fur of rodents, comprising:
    (a) a housing suspendible over a suspected rodent trail;
    (b) a reservoir mounted on said housing containing said materials;
    (c) liquidous rodent population control materials disposed in said reservoir;
    (d) rodent sensing means disposed generally above said trail for detecting the presence of a rodent in a target region located along said trail; and
    (e) material dispensing means responsive to said rodent sensing means for dispensing a predetermined amount of said material from said reservoir onto a dorsal fur region of said rodent while said rodent is within said target area.

2. The apparatus of claim 1 further comprising a guard means for limiting access by non-target species to said target region.

3. The apparatus of claim 1 wherein said reservoir is removably mounted in said housing.

4. The apparatus of claim 3 wherein said reservoir slidingly engages portions of the interior of said housing upon its removal therefrom.

5. The apparatus of claim 4 wherein said housing comprises a box having a removable top which, when removed, permits withdrawal of said reservoir from the interior thereof.

6. The apparatus of claim 1 wherein said material dispensing means is mounted on said reservoir for removal therewith.

7. The apparatus of claim 6 wherein said reservoir comprises at least one inclined bottom surface which cooperates with at least one inclined boss projecting from said housing to align said dispensing means with respect to said target region.

8. The apparatus of claim 1 wherein said dispensing means comprises an electrically actuated valve and a nozzle means for directing said material towards said target region when said valve is in its open position.

9. The apparatus of claim 8 wherein said housing comprises sound proofing means for reducing the sound of said valve which is audible from said trail.

10. The apparatus of claim 1 wherein said sensing means comprises a plurality of sensors located along said trail for detecting the position of said rodent with respect to said target area.

11. The apparatus of claim 10 wherein at least one of said sensors comprises an infrared light source, an infrared detector located in said housing and a reflective surface disposed generally adjacent to and above said trail for reflecting said light from said source to said detector unless interrupted by a rodent on said trail.

12. The apparatus of claim 10 wherein at least two of said sensors are disposed along said trail on opposite sides of said target region, and wherein said dispensing means dispenses material in response to the simultaneous sensing of said rodent by both of said at least two of said sensors.

13. The apparatus of claim 12 wherein at least four of said sensors are relatively disposed on opposite sides of said target area and wherein said dispensing means dispenses material in response to the simultaneous sensing of said rodent by all of said four of said sensors.

14. The apparatus of claim 1 further comprising suspension means for suspending said apparatus over a trail disposed on a tree limb.

15. The apparatus of claim 14 wherein said suspension means comprises an elongate member for engaging a portion of said limb and for limiting access of non-target species to said target region.

16. The apparatus of claim 10 wherein said sensors are heat sensors.

17. The apparatus of claim 10 wherein said sensors are ultrasonic motion sensors.

18. The invention of claim 15 wherein said sensors comprise vibration sensors.

19. The invention of claim 8 wherein said dispensing means further comprises control means for opening said valve to dispense said predetermined amount of said material.

20. The invention of claim 19 wherein said sensing means senses the relative sizes of said rodents and wherein different predetermined amounts of said control material are applied to different sized rodents in response thereto.

21. A method for applying rodent control materials such as poisons to the fur of rodents comprising:
   (a) providing an apparatus comprising
       (i) a housing;
       (ii) a reservoir mounted on said housing;
       (iii) rodent sensing means mounted on said housing for detecting the presence of a rodent in a target region located along said trail; and
       (iv) material dispensing means connected to said reservoir responsive to said rodent sensing means for dispensing a predetermined amount of said material from said reservoir onto a dorsal fur region of said rodent;
   (b) disposing rodent control materials in said reservoir; and
   (c) suspending said housing over a target area along a suspected rodent trail such that said apparatus will apply a predetermined amount of said material from said reservoir to the dorsal fur region of said rodent while said rodent is within said target area.

22. The method of claim 21 further comprising the step of limiting access by non-target species to said target region.

23. The method of claim 21 wherein said method comprises providing a reservoir which is removably mounted in said housing.

24. The method of claim 23 further comprising providing a reservoir which slidingly engages portions of the interior of said housing upon its removal therefrom.

25. The method of claim 24 further comprising providing said housing in the shape of a box having a removable top which, when removed, permits withdrawal of said reservoir from the interior thereof.

26. The method of claim 21 further comprising mounting said material dispensing means on said reservoir for removal therewith.

27. The method of claim 26 further comprising providing a reservoir having at least one inclined bottom surface which upon its insertion into said housing cooperates with at least one inclined boss projecting from said housing to align said dispensing means with respect to said target region.

28. The method of claim 21 further comprising providing a dispensing means comprising an electrically actuated valve and a nozzle means for directing said material towards said target region when said valve in its open position.

29. The method of claim 28 further comprising sound proofing said housing to reduce the sound of said valve which is audible from said trail.

30. The method of claim 21 further comprising locating a plurality of sensors along said trail for detecting the position of said rodent with respect to said target area.

31. The method of claim 30 further comprising providing as at least one of said sensors an infrared light source, an infrared detector located in said housing and a reflective surface disposed generally adjacent to and above said trail for reflecting said light from said source to said detector unless interrupted by a rodent on said trail.

32. The method of claim 30 further comprising providing at least two of said sensors disposed along said trail on opposite sides of said target region, and dispensing said material in response to the simultaneous sensing of said rodent by both of said at least two of said sensors.

33. The method of claim 32 further comprising providing at least four of said sensors relatively disposed on opposite sides of said target area, and dispensing material in response to the simultaneous sensing of said rodent by all four of said sensors.

34. The method of claim 21 further comprising suspending said apparatus over a trail disposed on a tree limb.

35. The method of claim 34 further comprising limiting access of non-target species under said apparatus.

36. The method of claim 35 further comprising providing sensors which are vibration sensors.

37. The method of claim 30 further comprising providing sensors which are heat sensors.

38. The method of claim 30 further comprising providing sensors which are ultrasonic motion sensors.

39. The method of claim 37 further comprising controlling the opening of said valve to cause it to dispense said predetermined amount of said material.

40. The method of claim 39 further comprising sensing the relative sizes of said rodents, and applying different predetermined amounts of said control material to different sized rodents in response to said sensing.

* * * * *